United States Patent [19]

Recktenwald et al.

[11] 4,153,659

[45] May 8, 1979

[54] ENHANCING SOLVENT BARRIER PROPERTY OF PIGMENTED POLYMERIC BODIES

[75] Inventors: Gerald W. Recktenwald, Allentown, Pa.; Larry J. Hayes, Roanoke, Tex.

[73] Assignee: Air Products and Chemicals, Inc., Allentown, Pa.

[21] Appl. No.: 820,670

[22] Filed: Aug. 1, 1977

[51] Int. Cl.$^2$ ............................................. B29C 25/00
[52] U.S. Cl. ...................................... 264/83; 106/309; 264/85; 264/516; 264/573; 264/102; 264/345
[58] Field of Search ........................ 264/94, 101–102, 264/345, 83, 85, 516, 573; 106/309

[56] References Cited

U.S. PATENT DOCUMENTS

| | | | |
|---|---|---|---|
| 2,378,539 | 6/1945 | Dawihl | 264/85 |
| 2,497,046 | 2/1950 | Kropa | 264/83 |
| 2,724,860 | 11/1955 | Strong | 264/99 |
| 2,811,468 | 10/1957 | Joffre | 264/83 |
| 3,002,846 | 10/1961 | Flasch | 106/309 |
| 3,441,387 | 4/1969 | Dye | 264/102 |
| 3,862,284 | 1/1975 | Dixon et al. | 264/99 |

Primary Examiner—Jeffery R. Thurlow
Attorney, Agent, or Firm—Thomas G. Ryder; Barry Moyerman

[57] ABSTRACT

The solvent barrier property of pigmented, solid polymeric articles is improved by pretreating the pigment particles prior to incorporation into the solid polymeric material so as to remove trapped gas from the surface and interstices of the pigment particles. Specific techniques for accomplishing this result include heating the pigment particles to a temperature above about 50° C., but below the calcination temperature, scrubbing the pigment particles with an inert gas and subjecting the pigment particles to a vacuum.

10 Claims, No Drawings

ENHANCING SOLVENT BARRIER PROPERTY OF PIGMENTED POLYMERIC BODIES

BACKGROUND OF THE INVENTION

This invention is directed to improving the solvent barrier property of pigmented articles fabricated from a solid polymeric material. More particularly, this invention accomplishes such result by the pretreatment of the pigment prior to its incorporation into the polymeric material.

The use of various types of polymeric materials, such as, for example, polymers and copolymers of polystyrene, polyacrylonitrile, polyvinyl chloride polyesters and polyolefins (particularly those having at least one aliphatic mono-1-olefin and up to about 8 carbon atoms), in the form of films, sheets and hollow containers in varioustypes of employments is well known. In fact, their use in employments where the passage of atmospheric gases or the passage of other gaseous or vaporous materials through the polymeric material is undesirable is wide-spread. Typical of such an employment is a blow molded bottle. The prior art has suggested various techniques for improving the barrier properties of containers of this type, for example, by the technique of contacting polyethylene blow molded containers with fluorine or the employment of a fluorine-containing gas in the blow molding operation itself. See, for example, U.S. Pat. Nos. 2,811,468 and 3,862,284. These prior art techniques apparently function by enhancing the barrier properties of the polymeric material itself.

It has now been determined that the incorporation of a pigment into the polymeric material adversely affects the barrier properties of the final pigmented material. This phenomenon is noticed even if the polymeric material has been treated with fluorine to enhance its barrier properties. Since many users of the polymeric materials desire that the polymeric materials be colored, this adverse affect of the pigment upon the barrier property becomes quite significant.

SUMMARY OF THE INVENTION

In accordance with the present invention, the pigment particles, prior to incorporation into the polymeric material, are subjected to a pretreatment so as to remove trapped gaseous oxygen (e.g. air or $O_2$) from the surface and interstices of the pigment particles. This removal of gaseous oxygen from the pigment paricles can be accomplished by heating the pigment particles, scrubbing the pigment particles with an inert gas (such as nitrogen), and/or subjecting the pigment particles to a vacuum.

In connection with the pretreatment of the pigment particles by use of an elevated temperature, it is emphasized that it is the pigment particles that are being pretreated, and not the polymeric material into which the pigment is incorporated. Thus, in accordance with this invention the pigment is heated before incorporation into the polymeric material. Generally, temperatures substantially above room temperature must be employed to drive off gases and, accordingly, a temperature of greater than about 50° C., is employed. Usually, the temperature employed will be at least about 75° C. and, preferably, at least about 100° C. Particularly preferred temperatures are those above about 150° C. Usually, the temperature employed in the pretreatment of the pigment is above the temperature employed for blow molding the polymeric material.

It is important, however, that temperatures above the melting or decomposition point of the pigment is avoided. Accordingly, the temperature is preferably limited to the range below about 1000° C. or even below about 800° C. Normally, an upper temperature limit of about 700° or 750° C. provides an adequate safety margin. As a practical matter, however, there is no great advantage to be gained in employing temperatures higher than about 300° C. It should also be noted that when relatively high temperatures are employed in pretreating the pigment, it is at times desirable to cool the pigment, such as by contact with a cool inert gas (e.g. nitrogen), before incorporating the pigment into the polymer.

This elevated temperature pretreatment is maintained for a period of time from about two minutes to about 24 hours. As a general rule, the shorter time periods are employed with the higher temperature. Usually, times of about 15 or 30 minutes are found to be satisfactory, particularly at temperatures greater than about 100° or 150° C. On the other hand, it is not seen that any advantage is to be gained in employing pretreating times greater than an hour or two.

In connection with the scrubbing of the pigment particles for the removal of gases such as air and oxygen, it has been found that the employment of nitrogen as the scrubbing gas is satisfactory. Other inert gases or types of gas which are suitable are helium, argon, carbon dioxide, etc. Generally, the scrubbing operation is continued for a period of at least about 5 minutes up to about 5 hours. Usually, the scrubbing is continued for at least about 10 minutes and, preferably, at least about 20 minutes. On the other hand the scrubbing operation is not continued for more than about 2 hours, with a scrubbing time of up to about 45 minutes normally being acceptable. The scrubbing gas should be employed in a quantity of from about 1 volume to about 100 volumes of scrubbing gas per volume of pigment particles. Usually, at least about 5 volumes of scrubbing gas per volume of pigment particles is used. As will be understood, adequate time must be provided for a sufficient quantity of scrubbing gas to contact the pigment particles at a convenient gas flow rate when employing a continuous operation.

In the procedure of removing gases from the pigment particles by employment of a vacuum, it is apparent that the greater the vacuum the more effective the treatment will be. It has been found that, as a practical matter, a vacuum of less than about 50 torrs. is to be employed.

It is also within the scope of this invention to employ a combination of two or of all three of the above-discussed techniques. Thus, for example, the heating of the pigment particles can be combined with a scrubbing or flushing with nitrogen and followed by an evacuation of the treating area.

As will be understood, once the gaseous oxygen has been driven off from the surface or interstitial spaces of the pigment particles, such pretreated pigment particles must be incorporated into the solid polymeric material before gaseous oxygen has an opportunity to become re-entrapped on the surface of interstices of the pigment particles. This re-entrapment of oxygen can be prevented either by incorporating the pretreated pigment particles into the solid polymeric material promptly or by storing the pretreated pigment particles under a non-oxygen containing atmosphere, such as, for example, a nitrogen blanket.

The efficacy of this invention is at times affected by the extent or intimacy of the mixing of polymer and pigment and by the total pigment loading in the polymer. Thus, the better the mixing of pigment and polymer, the greater is the efficacy of this invention. Generally, it has been found that extrusion, particularly double extrusion, results in a better mixing of polymer and pigment than merely milling. Usually, a greater concentration of pigment can be incorporated into the polymer when using a better mixing technique. For example, when dealing with mixing via extrusion, the quantity of pigment that can be incorporated in accordance with this invention can be several times as great as when using a less efficient mixing technique, such as milling. In any event, the quantity of pigment which can be incorporated in accordance with this invention is more than adequate to provide adequate coloring and opacity. The pigment can be present in quantities of up to about 5 or 10% by weight. Usually, however, it is customary to employ pigments and fillers in the range of less than about 2% by weight.

It has also been found that the pigment pretreating procedure of this invention is not only effective by itself to enhance the barrier property of pigmented polymeric materials, but is particularly effective when employed in conjunction with the technique of fluorine treating of the polymer material either by fluorine post-treatment or by employing a fluorine containing gas as the blowing gas. In fact, it has been found that there is a unique cooperation or coaction evidenced when pigment pretreatment, in accordance with this invention, is used in combination with fluorine treatment. As will be demonstrated in the examples below, the employment of the pigment pretreatment together with the fluorine treatment results in an enhancement of the barrier property of pigmented polymeric materials which is substantially greater than what might be anticipated as a mere additive effect of each of the treatments employed separately. This coaction is especially pronounced when a fluorine-containing gas is employed as the blowing gas, as distinguished from fluorine post-treatment.

For convenience in testing, the polymeric materials treated in accordance with this invention in the following examples were in the form of hollow, blow-molded bottles. It will be understood, of course, that many of the same principles apply and in many instances the blow-molded bottle is equivalent to a sheet or film of the polymeric material. Generally, the technique employed in producing these bottles was to extrude a thermoplastic polymeric material through an annular extrusion nozzle to form a parison of the polymeric material. After the parison had been formed, it was expanded within a mold by being blown with a compressed fluid or blowing gas to force the parison to conform with the contour of the surrounding mold cavity. This particular technique is well-known in the art and is described, for example, in U.S. Pat. No. 2,724,860.

In order to illustrate this invention in greater detail, reference is made to the following examples.

EXAMPLE 1

The pigment employed in this example was titanium dioxide ($TiO_2$) obtained from N&L Industries under the designation of 2071. A sample of this pigment was heated at a temperature of 180° C. for a period of 30 minutes. After such pretreatment, the hot pigment was then added to a quantity of molten virgin polyethylene resin in a quantity sufficient to form a 12.5% by weight concentrate of pigment in the polyethylene. This concentrate was then blended with more virgin resin to obtain a final pigmented resin containing 2% by weight $TiO_2$. Another sample of the same $TiO_2$ pigment, which had not been subjected to pretreatment, was blended in a cold state with a separate quantity of molten polyethylene resin to form a 12.5% by weight concentrate, which in turn was blended with additional virgin resin to obtain a second quantity of 2% $TiO_2$ pigmented resin. Each of these separately prepared pigmented resins was then separately employed, generally in the manner described above, for the the preparation of four blow-molded one-quart bottles. The blowing gas employed in all instances was air. One of the bottles prepared with the pretreated pigment and one of the bottles prepared from the unpretreated pigment were each subjected to a post-treatment by exposure for a period of 10 minutes to a gas blend comprising 10% $F_2$ in $N_2$.

Each of the four bottles was then filled with approximately equal quanitities of toluene. The toluene-containing bottles were then capped with a heat sealable cap line (polyethylene liner heat sealed to top of bottle) followed by a screw-on metal cap. This type of seal allows virtually no leakage. The bottles were then placed in a hotbox at a temperature of 50° C. The amount of toluene lost from each bottle was recorded at 6 and 21 days of test time. The results of this test are shown in Table I below.

TABLE I

| $TiO_2$ Pretreatment | $F_2$ Post-treatment | % wt. Loss Toluene at 50° C. | |
|---|---|---|---|
| | | 6 days | 21 days |
| No | No | 22.8 | 76.3 |
| Yes | No | 18.9 | 63.1 |
| No | Yes | 19.1 | 58.8 |
| Yes | Yes | 1.7 | 8.7 |

From the data presented in Table I it will be seen that the pretreatment of the pigment in accordance with the present invention is effective to enhance the barrier property of the polyethylene and, in fact, that such enhancement is comparable to, if not superior to, the barrier property enhancement obtained by the art recognized technique of fluorine post-treatment. It will further be seen that when the technique of pigment pretreatment is employed in combination with flourine treatment, a unique cooperation or coaction results and the weight loss of toluene is reduced by an entire order of magnitude.

EXAMPLE 2

In this example the pigment employed was also titanium dioxide. One portion of this pigment was maintained in a fluidized bed for a period of ½ hour while another portion was pretreated in a fluidized bed for 4½ hours employing nitrogen as the fluidizing gas. After such pretreatment, portions of the two pretreated pigments were incorporated into separate batches of polyethylene much in the manner as described above in Example 1 so as to provide two separate batches, one containing 0.5% titanium dioxide and the other containing 2.0% titanium dioxide. Each of these separate batches of pigmented polyethylene was then blow molded employing two blowing gases, one having a fluorine content of 5%, and the other 8% by volume with the balance in both cases being nitrogen. Representative samples of each of the types of containers were then filled with toluene, sealed and maintained at a temperature of 50° C. The following Table II shows average toluene weight loss after 8 days as compared to typical weight losses ranging up to 40% or more for unpretreated pigmented articles.

TABLE II

| % TiO$_2$ | Time in Fluid Bed, hrs. | % Fin Blowing Gas | % Toluene Wt. Loss at 50° C. after 8 days |
|---|---|---|---|
| 0.5 | 0.5 | 5 | 3.3 |
| 0.5 | 0.5 | 8 | 1.5 |
| 0.5 | 4.5 | 5 | 1.6 |
| 0.5 | 4.5 | 8 | 2.0 |
| 2.0 | 0.5 | 5 | 5.9 |
| 2.0 | 0.5 | 8 | 3.9 |
| 2.0 | 4.5 | 5 | 5.3 |
| 2.0 | 4.5 | 8 | 6.5 |

The procedures outlined immediately above are repeated with various other pigments such as, for example, lead chromate, iron oxide, metallic copper flake, carbon black, channel black, furnace black, benzidine (yellow) and phthalocyanine (blue and green). Substantially reduced weight losses are obtained when the pigments are pretreated with non-oxygen containing gas in the manner as described above.

EXAMPLE 3

In this example quantities of titanium dioxide, lead chromate, iron oxide, metallic copper flake, carbon black, channel black, furnace black, benzidine and phthalocyanine (blue and green) are employed. Each of these pigments is separated into two portions and one of the portions of each pigment is subjected to a vacuum of less than about 50 Torrs. for a period of about 10 minutes. Both the vacuum pretreated and unpretreated portions of each of the pigments is then incorporated into separate batches of polymeric material, i.e., polyethylene, so as to provide separate batches of polymeric materials containing unpretreated and pretreated pigment in typical commercial quantities. Each of these batches was then employed to produce blow molded containers which are then subjected to posttreatment for a period of up to about ½ hour at room temperature with a gas containing about 10% by volume fluorine. Upon filling with toluene, sealing and storage at an elevated temperature, those containers made with the pretreated pigments showed a significantly lower weight loss as compared to the corresponding container made with the nonpretreated pigment.

EXAMPLE 4

In this example polyethylene samples pigmented with titanium dioxide were prepared. Three separate portions of titanium dioxide were each pretreated for a period of 45 minutes prior to milling into the polyethylene. The temperatures employed for the three separate pretreatments were 85°, 130°, and 210° C. Each of the three portions of pretreated titanium dioxide were employed to produce pigmented polyethylene containing 0.5% titanium dioxide and 2.0% titanium dioxide. Each of the mixtures of pigmented polyethylene containing the pigment in two different concentrations and pretreated at the three different temperatures was then employed to produce blow molded bottles. The techniques employed for the production of bottles were blow molding with non-fluorine containing blowing gas and without post-treatment, blow molding with non-fluorine containing blowing gas followed by post treatment with 10% fluorine containing gas for a period of 10 minutes, and blow molding with a fluorine containing gas in each of the three concentrations of 2%, 5% and 8% fluorine.

Each of the bottles produced in the various manners described above was then filled with approximately equal quantities of toluene and the toluene containing bottles were then sealed and then placed in a hot box at a temperature of 50° C. for a period of 8 days. The amount of toluene lost from each of the bottles is shown in Table III below.

TABLE III

| Pretreat Temp., °C. | F treatment post | blowing gas | Toluene loss after 8 day Wt. % 0.5% TiO$_2$ | 2.0% TiO$_2$ |
|---|---|---|---|---|
| 85 | — | — | 48.7 | 45.5 |
| 85 | 10% | — | 24.4 | 23.4 |
| 85 | — | 2% | 2.5 | — |
| 85 | — | 5% | 2.2 | — |
| 85 | — | 8% | 2.4 | — |
| 130 | — | — | 47.7 | 50.7 |
| 130 | 10% | — | 7.9 | 24.9 |
| 130 | — | 2% | 0.7 | 1.5 |
| 130 | — | 5% | 0.6 | 0.8 |
| 130 | — | 8% | 0.6 | 0.5 |
| 210 | — | — | 47.5 | 50.4 |
| 210 | 10% | — | 7.6 | 25.0 |
| 210 | — | 2% | 0.4 | 1.6 |
| 210 | — | 5% | 0.5 | 1.1 |
| 210 | — | 8% | 0.3 | 0.4 |

From the above data it can be seen that a significant increase in barrier properties is obtained when the pigment pretreating temperature is in excess of about 100° C. Further, it can be seen that the technique of employing a fluorine containing gas as the blowing gas provides an even further enhancement of the barrier property over that obtained with pigment pretreating alone, or pigment pretreating combined with fluorine post-treating. As might also be expected, the efficacy of a particular pretreating alone or pretreating in combination with fluorine treating is reduced somewhat as the pigment content of the polymeric material is increased. Thus, as a general rule, more severe conditioning is required as the pigment content of the polymeric material rises.

What is claimed is:

1. A process for improving the solvent barrier property of a pigmented article composed of a solid polymeric material, which process comprises pretreating pigment particles prior to incorporation into the polymeric material so as to remove trapped gas from the surfaces and interstices of the pigment particles, admixing the pretreated pigment particles with the polymeric material, forming the article from the mixture of pretreated pigment and polymeric material, and subjecting the pigmented article to a treatment with fluorine gas.

2. The process of claim 1 wherein the pigment particles are pretreated by being subjected to a temperature above about 50° C. and below the decomposition temperature of the pigment.

3. The process of claim 1 wherein the pigment particles are pretreated by scrubbing with an inert gas.

4. The process of claim 1 wherein the pigment particles are pretreated by being subject to a vacuum of less than about 50 Torrs.

5. The process of claim 2 wherein the pigment particles are pretreated at a temperature from about 50° to about 750° C. for a period of time from about 2 minutes to about 24 hours.

6. The process of claim 5 wherein the temperature is in the range from about 75° to about 300° C.

7. The process of claim 1 wherein the pretreated pigment particles are admixed with polymeric material maintained at a temperature above the softening point of the polymeric material.

8. The process of claim 3 wherein the scrubbing is effected by employing the gas to maintain the pigment particles in a fluidized bed.

9. A process for improving the solvent barrier property of a pigmented article composed of a solid polymeric material, which process comprises pretreating pigment particles prior to incorporation into the polymeric material so as to remove trapped gas from the surfaces and interstices of the pigment particles, admixing the pretreated pigment particles with the polymeric material, and then forming the article from the mixture of pretreated pigment and polymeric material by blow molding with a fluorine-containing blowing gas.

10. The process of claim 9 wherein the pigment particles are pretreated by being subjected to a temperature above about 50° C. and below the decomposition temperature of the pigment.